United States Patent
Makineni et al.

(10) Patent No.: US 11,585,949 B2
(45) Date of Patent: Feb. 21, 2023

(54) LOW-LIGHT AND NO-LIGHT AERIAL NAVIGATION

(71) Applicant: SKYDIO, INC., Redwood City, CA (US)

(72) Inventors: Anurag Makineni, San Jose, CA (US); Kristen Marie Holtz, Redwood City, CA (US); Gareth Benoit Cross, San Carlos, CA (US); Hayk Martirosyan, San Francisco, CA (US)

(73) Assignee: SKYDIO, INC., Redwood City, CA (US)

( * ) Notice: Subject to any disclaimer, the term of this patent is extended or adjusted under 35 U.S.C. 154(b) by 316 days.

(21) Appl. No.: 17/070,997

(22) Filed: Oct. 15, 2020

(65) Prior Publication Data
US 2022/0120918 A1     Apr. 21, 2022

(51) Int. Cl.
| | |
|---|---|
| *G01S 19/47* | (2010.01) |
| *B64C 39/02* | (2023.01) |
| *G08G 5/00* | (2006.01) |
| *G01P 15/18* | (2013.01) |
| *G01C 19/00* | (2013.01) |
| *G01P 15/08* | (2006.01) |

(52) U.S. Cl.
CPC ............ *G01S 19/47* (2013.01); *B64C 39/024* (2013.01); *G01C 19/00* (2013.01); *G01P 15/08* (2013.01); *G01P 15/18* (2013.01); *G08G 5/0065* (2013.01); *G08G 5/0069* (2013.01); *B64C 2201/027* (2013.01); *B64C 2201/145* (2013.01)

(58) Field of Classification Search
CPC .......... G01S 19/47; G01S 19/14; G01S 19/53; B64C 39/024; B64C 2201/027; B64C 2201/145; G01C 19/00; G01P 15/08; G01P 15/18; G01P 15/0891; G08G 5/0065; G08G 5/0069; G08G 5/0021
USPC ......................................................... 701/15
See application file for complete search history.

(56) References Cited

U.S. PATENT DOCUMENTS

| | | | | |
|---|---|---|---|---|
| 2010/0150404 | A1* | 6/2010 | Marks ................... | A63F 13/211 348/136 |
| 2016/0225264 | A1* | 8/2016 | Taveira ................. | G05D 1/102 |
| 2016/0253907 | A1* | 9/2016 | Taveira ................ | G08G 5/0039 701/3 |

(Continued)

FOREIGN PATENT DOCUMENTS

WO    WO-2018009262 A1 *  1/2018   ........... B64C 39/024

*Primary Examiner* — Muhammad Shafi
(74) *Attorney, Agent, or Firm* — Mattingly & Malur, PC

(57) ABSTRACT

In some examples, an unmanned aerial vehicle (UAV) may receive location information via the global navigation satellite system (GNSS) receiver and may receive acceleration information via an onboard accelerometer. The UAV may determine a first measurement of acceleration of the UAV in a navigation frame of reference based on information from the accelerometer prior to or during takeoff. In addition, the UAV may determine a second measurement of acceleration of the UAV in a world frame of reference based on the location information received via the GNSS receiver prior to or during takeoff. The UAV may determine a relative heading of the UAV based on the first and second acceleration measurements. The determined relative heading may be used for navigation of the UAV at least one of during or after takeoff of the UAV.

17 Claims, 10 Drawing Sheets

(56) References Cited

U.S. PATENT DOCUMENTS

2017/0211997 A1* 7/2017 Kulach ............... A63C 5/06
2018/0233055 A1* 8/2018 Damnjanovic ...... G05D 1/0022
2020/0115050 A1* 4/2020 Murakoshi ............. G06V 20/17

* cited by examiner

LOW-LIGHT AND NO-LIGHT AERIAL NAVIGATION

BACKGROUND

Unmanned aerial vehicles (UAVs) typically are operated manually such as by a human using a controller to remotely control the movements of the UAV. More recently, UAVs with automated flight and autonomous control features have become available. These autonomous UAVs may rely on multiple on-board sensors for performing auto-navigation functions, such as following a moving subject, taking images of a specified area or location, traveling a prescribed route, and so forth, while concurrently avoiding collisions and respecting dynamics limits. In certain cases, some onboard sensors may be unable to provide sufficient information for normal navigation. For example, when there is no light or low light, navigation cameras might not provide sufficiently clear images for enabling localization and other navigation functions. Furthermore, structural steel, rebar and other ferromagnetic material in structures, etc., can affect the accuracy and reliability of compasses or other magnetometers that may also typically be relied on during autonomous navigation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
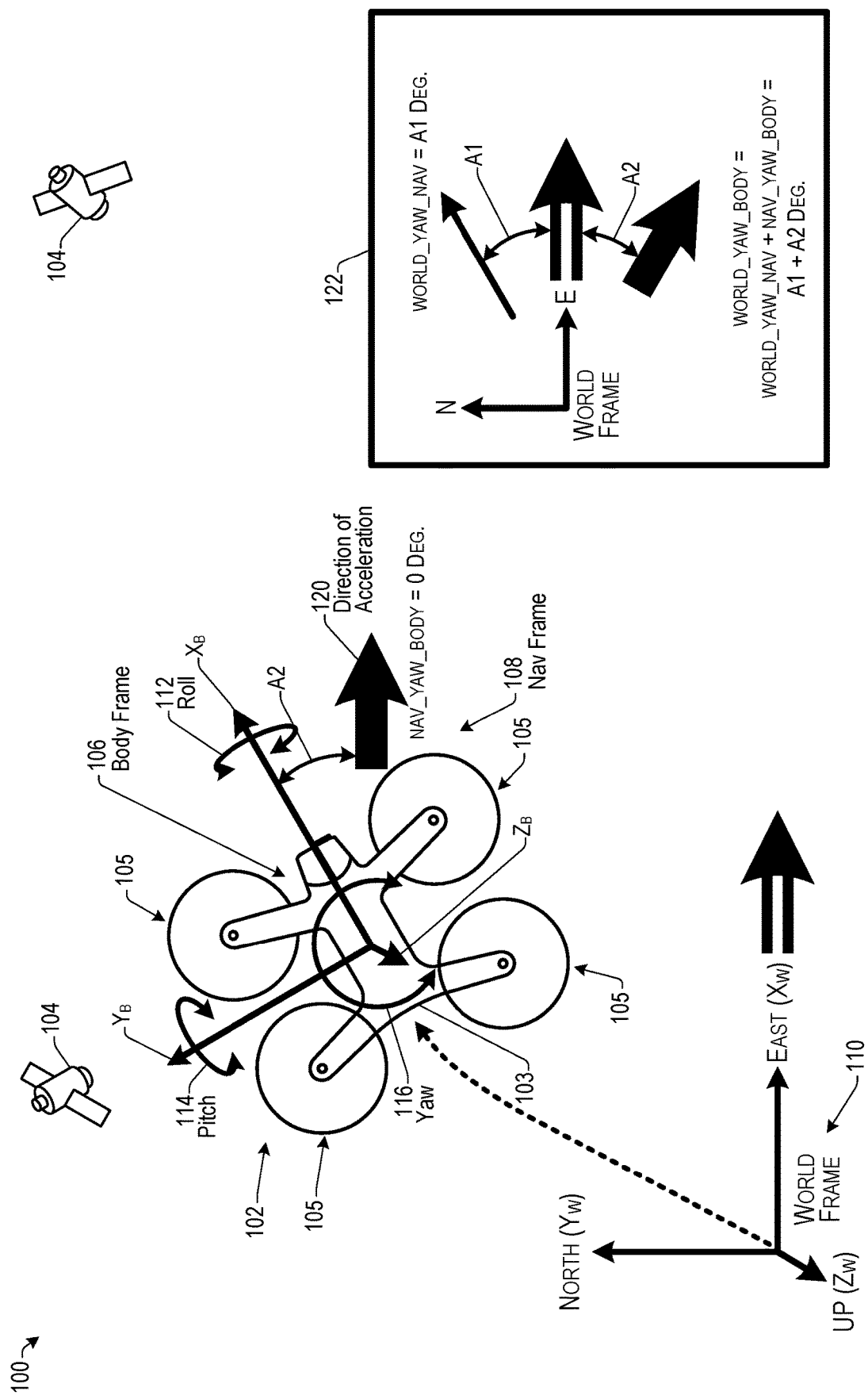
FIG. 1 illustrates an example system including a UAV and relevant coordinate frames according to some implementations.

Some implementations herein are directed to techniques and arrangements for enabling a UAV to navigate based on acceleration and position information without relying on inputs from cameras, and without relying on inputs from a compass or other magnetometer. For instance, the UAV may receive a series of location signals through a global navigation satellite system (GNSS) receiver. The received GNSS signals may be indicative of locations of the UAV within a world frame of reference. The UAV may use the location signals from the GNSS receiver to determine a location and velocity of the UAV. Further, the UAV may determine an acceleration signal and orientation signal within a navigation frame of reference based on acceleration signals from one or more accelerometers and angular rate signals from one or more gyroscopes, such as may be associated with an inertial measurement unit (IMU) onboard the UAV.

In some examples herein, three different coordinate frames of reference may be employed to describe the position and orientation of the UAV. For instance, a body frame of reference may be associated with the UAV itself. In addition, a navigation frame of reference may be initialized shortly before or during takeoff at a starting yaw position and may have a roll and pitch aligned to Earth's gravity vector. Furthermore, a world frame may be used to describe the position of the UAV in global coordinates.

The UAV may initially have a known world orientation that may be determined using a prescribed launch technique or pre-takeoff orientation technique that orients the onboard accelerometer and gyroscope associated with the IMU relative to the world frame of reference. The UAV may determine a plurality of sequential relative headings for the UAV based on the GNSS information and the IMU information. The UAV may apply a weighted sampling technique to the plurality of relative headings for selecting a specific relative heading as the current selected relative heading of the UAV. For instance, a plurality of directional bins may be established, and one or more scoring points may be added to assign respective likelihood scores to particular bins based on a particular bin matching a respective relative heading of the plurality of relative headings. When the value of the points in any one of the bins exceeds a threshold value, the relative heading corresponding to that bin may be selected as the current selected relative heading of the UAV.

Further, a standard deviation estimate of the selected relative heading may be used to indicate how uncertain the selected relative heading is. A confidence may be estimated as a sum of the likelihoods of the bins nearest to the most likely bin. The standard deviation may then be determined by transforming via some heuristic, for example by scaling the confidence value between a minimum and maximum confidence, and converting that into an angle.

Once the selected relative heading for the UAV has been determined to be within a threshold degree of confidence, the world (global) heading of the UAV may be calculated by converting from the navigation frame of reference to the world frame of reference. The world heading for the UAV (and/or the relative navigation heading) may be provided to one or more navigation algorithms, a flight controller, or the like, such as for initializing flight, during a takeoff, or during flight after takeoff.

In some examples, the UAV may detect that there is insufficient light for navigation with onboard navigation cameras, and may automatically switch to navigation solely based on GNSS and IMU. In some cases, the UAV may make this determination prior to takeoff, and may notify the user. The UAV may signal the user, such as via a user interface (UI), LED, sound, voice commands, or the like, that navigation via cameras is not available and that an attitude orientation motion sequence may be initiated prior to takeoff or during takeoff.

As one example, the user may manually induce motion on the UAV prior to the UAV taking off to orient the navigation frame of reference of the UAV with respect to the world frame of reference. For instance, the user may manually move the UAV back-and-forth at arm's length several times until the UAV has received sufficient motion inputs to determine a relative heading. Alternatively, the UAV may be configured to automatically perform self-orientation during takeoff, e.g., by taking off at a known acceleration profile during which time the UAV may perform auto estimation of the relative heading.

For discussion purposes, some example implementations are described in the environment of navigating a UAV based on GNSS information and IMU information, and without the use of navigation cameras or a magnetometer. However, implementations herein are not limited to the particular examples provided, and may be extended to other types of sensing devices, other types of vehicles, other types of location tracking information, and so forth, as will be apparent to those of skill in the art in light of the disclosure herein.

FIG. 1 illustrates an example system 100 according to some implementations. The system 100 includes a UAV 102 viewed from above in this figure. The UAV 102 may include a body 103, propulsion devices 105, and a global navigation satellite system (GNSS) receiver (not shown in FIG. 1) onboard the UAV 102. The GNSS receiver may be able to receive signals from one or more satellites 104 of a GNSS, such as the Global Positioning Satellite (GPS) system, the Russian Global Navigation Satellite System (GLONASS), the Chinese BeiDou Navigation Satellite System (BDS) the European Union's Galileo system, the Japanese Quasi-Zenith Satellite System (QZSS), the Indian Regional Navigation Satellite System (IRNSS), and so forth.

The UAV 102 may initially determine a relative heading of the UAV 102 using at least one of a controlled acceleration launch technique during takeoff or a pre-takeoff relative heading determination technique, as discussed additionally below, that orientates a navigation frame of reference and relative to a world frame of reference. For example, to describe the position and orientation of the UAV 102, three different coordinate frames of reference may be employed in some examples herein. In particular, a body frame of reference, referred to hereinafter as body frame 106, may be associated with the body 103 of the UAV 102 itself, e.g., corresponding to a center of gravity and longitudinal axis or other suitable location(s) on the UAV 102. The body frame 106 may include an X axis $X_B$ pointing forward coincident or parallel to the longitudinal axis of the UAV 102, a Y axis $Y_B$ pointing left, and a Z axis $Z_B$ pointing up.

In addition, a navigation frame of reference, Nav frame 108, may be initialized shortly before or during takeoff at a starting yaw position and may have a roll and pitch aligned to Earth's gravity vector. For instance, the initial yaw of the Nav frame 108 may be set to zero, and, therefore, the Nav frame 108 may be initially coincident with the takeoff location and the body frame 106. Similar to the body frame 106, the Nav frame 108 may have an X axis pointing to the front, a Y axis pointing to the left and a Z axis pointing up (not shown).

Furthermore, a world frame 110 may be used to describe the position of the body 103 of the UAV 102 in global coordinates. The world frame 110 may correspond to a locally-linearized GNSS coordinate frame, with an origin corresponding to a given set of GNSS coordinates (i.e., latitude, longitude, elevation). As one example, the origin may be initialized based on a first received valid GNSS location fix. The world frame 110 includes an X axis $X_W$ pointing East, a Y axis $Y_W$ pointing North, and a Z axis $Z_W$ pointing up.

In this example, rotation terminology references are illustrated for the body frame 106, and include roll 112, which indicates a degree of rotation about the X axis, pitch 114, which indicates a degree of rotation about the Y axis, and yaw 116, which indicates a degree of rotation about the Z axis. Similar rotation terminology applies to the axes of the Nav frame 108 and the world frame 110.

When flying the UAV 102 based on GNSS information, the heading of the UAV 102 with respect to the world frame of reference 110 may be useful for performing navigation. Typically, determining the yaw angle of the UAV 102 is useful for determining and controlling the heading and thereby the navigation of the UAV 102. For example, the UAV 102 may include one or more algorithms executed by at least one processor (not shown in FIG. 1) to estimate the relative heading of the UAV 102. The processor may receive, as inputs, GNSS location coordinates in the world frame 110. The processor may also receive measurements in the body frame 106 based on the output of the vehicle IMU, which may include the acceleration of the UAV 102 and the rotation of the UAV 102 relative to the Nav frame. Based on these inputs, the processor is able to compute the rotation between the world frame 110 and the Nav frame 108 (e.g., a yaw angle). When the yaw angle of the body of the UAV 102 is determined with respect to the world frame, the heading of the UAV 102 can be used for controlling the navigation of the UAV 102.

In the example of FIG. 1, suppose that the UAV 102 is accelerating in the direction indicated by arrow 120 and that this direction corresponds to a yaw of A1 degrees in the Nav frame 108, and further suppose that this direction of arrow 120 corresponds to yaw of angle A2 with respect to the body frame 106. As indicated in box 122, the yaw of the body of the UAV in the world frame (world_yaw_body) may be determined based on the yaw of the navigation frame with respect to the world frame (world_yaw_nav) and the yaw of the navigation frame with respect to the body frame (nav_yaw_body). Accordingly, in this example, yaw of the body with respect to the world frame, i.e., world_yaw_body=world_yaw_nav+nav_yaw_body, which is equal to A1+A2 degrees.

Figure 2:
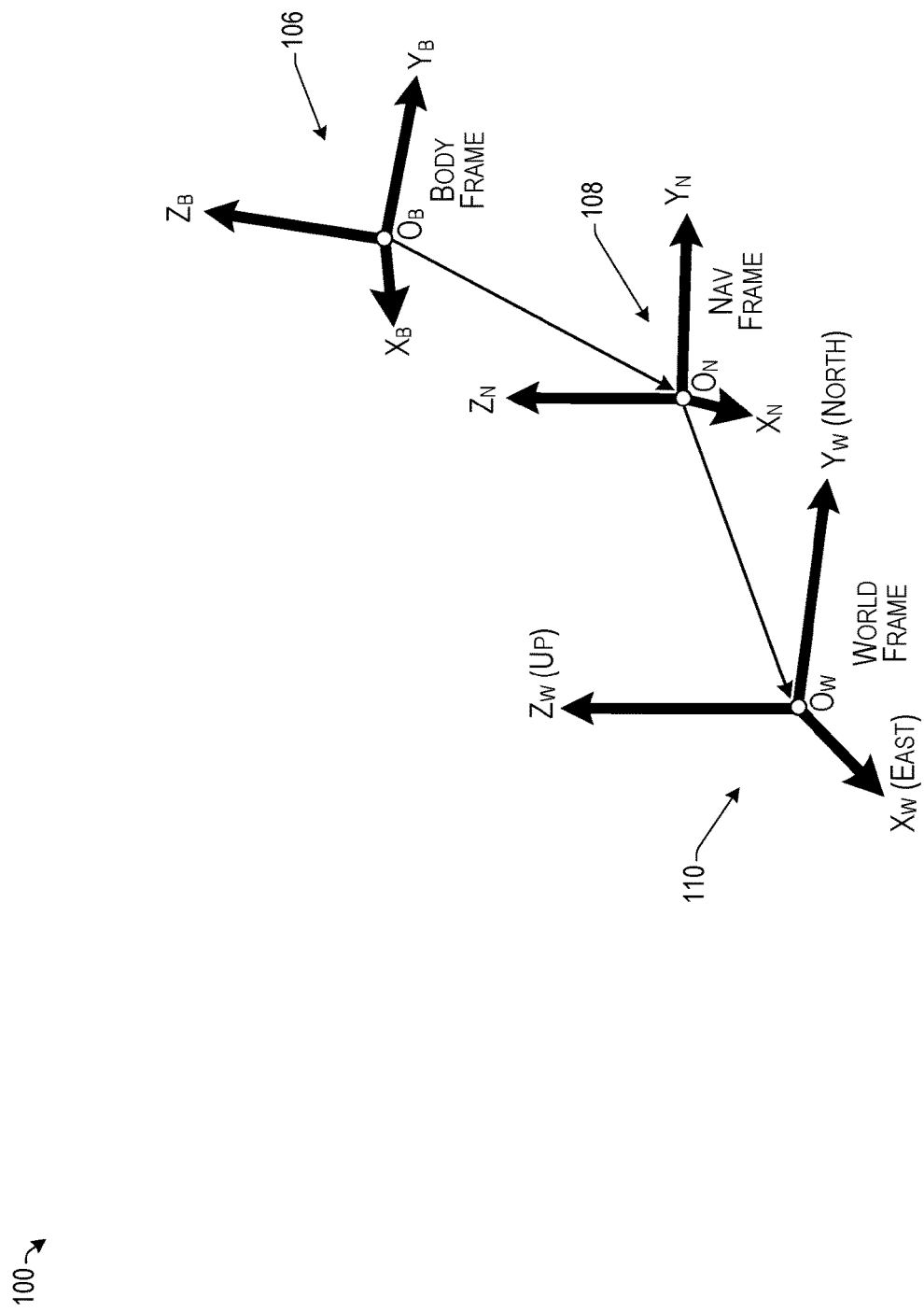
FIG. 2 illustrates an example of translating between the three frames of reference according to some implementations.

FIG. 2 illustrates an example 200 of translating between the three frames of reference according to some implementations. As mentioned above, the body frame 106 is associated with the UAV 102 itself and does not change with respect to the UAV 102. The body frame 106 may include the axis $X_B$ pointing forward (e.g., the front of the UAV 102 based on primary travel orientation), with the axis $Y_B$ pointing left (with respect to the point of view of vehicle travel) and axis $Z_B$ pointing up. The body frame 106 may further include an origin point $O_B$, which may correspond to the center of gravity of the UAV 102 or other selected location on the UAV 102.

The Nav frame 108 includes axes initially oriented similarly to the body frame 106. Thus, the Nav frame 108 includes axis $X_N$, axis $Y_N$, and axis $Z_N$ pointing up. As discussed additionally below, the Nav frame's origin $O_N$ is initialized shortly before takeoff to be identical with the body frame origin $O_B$, and the roll and pitch of the Nav frame (corresponding to axis $X_N$ and axis $Y_N$, respectively) may be aligned to Earth's gravity vector and the initial yaw with respect to the body frame 106 may be set to zero. Thus, the Nav frame 108 origin $O_N$ may be coincident with the takeoff location.

In addition, the world frame 110 may be used to describe the position of the body frame 106 in terms of global coordinates. The world frame 110 may correspond to a locally-linearized GNSS coordinate frame having an origin OW corresponding to a given set of GNSS coordinates (latitude, longitude, elevation). The origin OW may be initialized based on a received valid GNSS location for the GNSS receiver onboard the UAV 102. As mentioned above, the world frame includes the axis $X_W$ corresponding to global East, axis $Y_W$ corresponding to global North, and axis $Z_W$ corresponding to global up. Furthermore, while the terms "world frame", "Nav frame" and "body frame", as described in FIGS. 1 and 2, are used to refer to the frames of reference defined in some examples, implementations herein are not limited to the frames of reference described in the examples. Additional or alternative frames of reference may be used in other examples, as will be apparent to those of skill in the art having the benefit of the disclosure herein.

The pose (e.g., attitude and heading) of the UAV 102 may be described by the rigid body transformation from body frame 106 to Nav frame 108, and which may be represented as transformation $T_{NB}$. The transformation $T_{NB}$ may include a rotation $R_{NB} \in SO(3)$ where SO(3) is the group of all rotations about the origin of three-dimensional Euclidean space $R^3$ and translation $t_{NB} \in R^3$. The position of the Nav frame 108 with respect to the world frame 110 may be described by the transformation $T_{WN}$ with a global heading $R_{\varphi WN}$ and translation $t_{WN}$. This transformation may occur in a locally-linearized GNSS world frame 110 with its origin at $O_W$ which corresponds to a given set of GNSS coordinates (latitude, longitude, elevation). The world frame transform function g(lat, long, alt)→$R^3$ converts the latitude, longitude and altitude about the origin of the world frame 110. For example, the latitude and longitude may be projected onto a plane tangent to the earth ellipsoid, centered on the origin $O_W$.

Because GNSS measurements may exhibit a random-walk drift over time, an estimate of the drift may be incorporated into the translation $t_{WN}$. The global heading $R_{\varphi WN}$ may be estimated based on differences in locations indicated by the GNSS measurements over time and measured body acceleration from the onboard IMU (not shown in FIG. 2). In some examples, the IMU may be configured to detect linear acceleration using one or more accelerometers and to detect rotational rate using one or more gyroscopes. As one example, the IMU may be a self-contained system with a three-axis gyroscope and a three-axis accelerometer. As one example, the IMU may output the quantity of acceleration in the body frame of reference 106.

Figure 3:
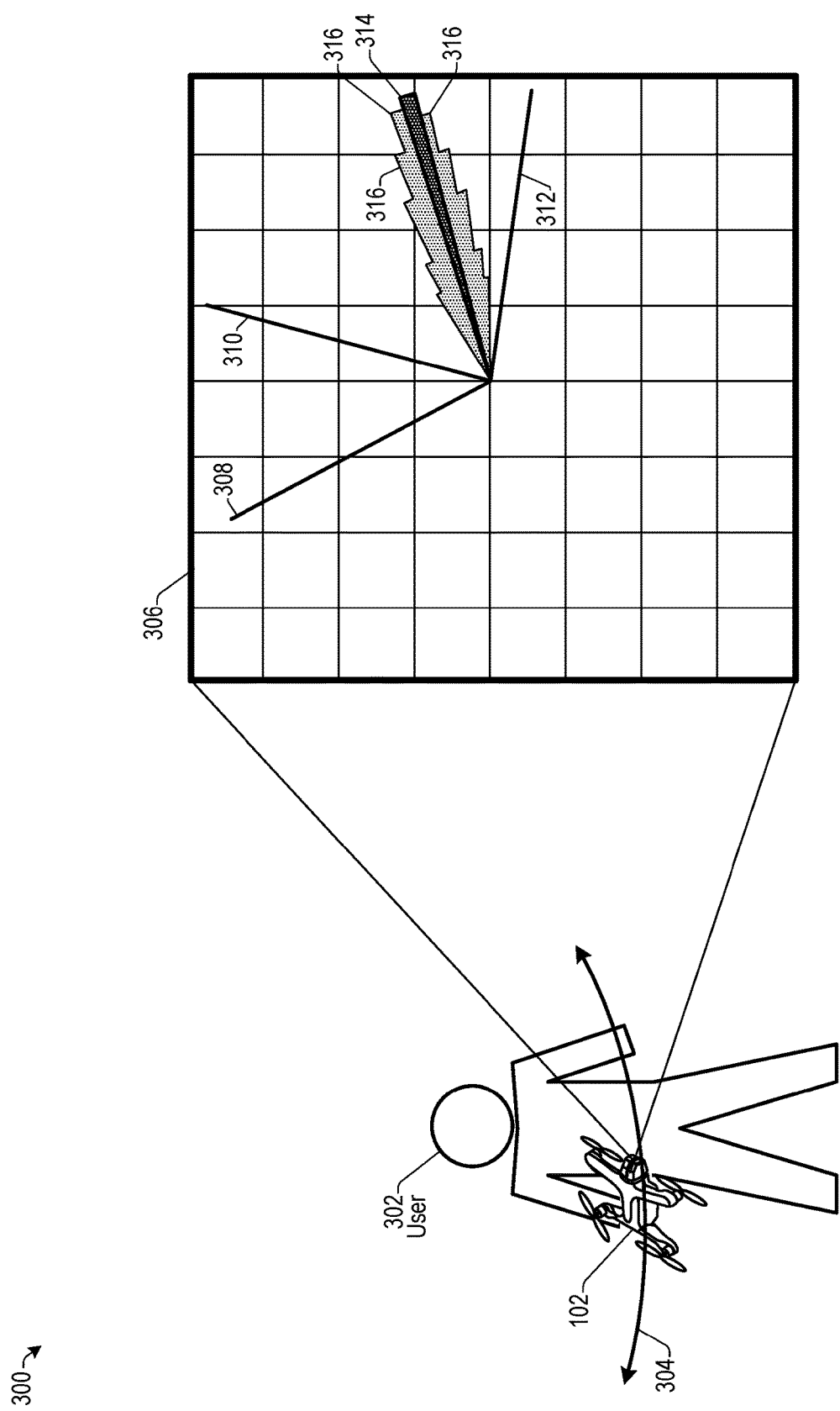
FIG. 3 illustrates an example of initializing a UAV in preparation for navigation without use of navigation cameras or a magnetometer according to some implementations.

FIG. 3 illustrates an example 300 of initializing a UAV 102 in preparation for navigation without use of navigation cameras or a magnetometer according to some implementations. As one example, prior to the UAV 102 taking off, the heading of the UAV 102 in the world frame 110 may be determined for enabling successful navigation following takeoff. In this example, prior to the UAV 102 being enabled to takeoff, a user may induce motion in the UAV 102 for a sufficient time and/or amount of motion to enable the UAV 102 to determine a relative heading of the UAV 102 in the Nav frame 108. If the determined relative heading has sufficient certainty, as discussed additionally below, the UAV 102 may takeoff and proceed with navigation based on the determined relative heading, which may be translated to a world frame heading for controlling navigation of the UAV 102 in the world.

In the illustrated example, a user 302 may manually induce a controlled motion on the UAV 102, e.g., as indicated by the arrow 304. For instance, the user 302 may hold the UAV 102 at arm's length and move the UAV 102 back and forth in a semicircular, generally horizontal motion. This motion enables the algorithm discussed with respect to FIGS. 5 and 6 below to determine a plurality of acceleration and rotation inputs that can be used in combination with GNSS data for converging to determine a relative heading of the UAV 102 between the Nav frame 108 and the world frame 110.

As one example, as indicated at 306, the UAV 102 may apply a weighted sampling technique to a plurality of relative headings for selecting a particular one of the relative headings to use as the current selected relative heading for the UAV 102. For instance, a plurality of directional bins corresponding to the possible angles of the relative heading may be established, and one or more scoring points may be applied to one or more particular bins based on the one or more particular bins matching a calculated relative heading. In some examples, more weight may be given to points that correspond to higher acceleration magnitudes (or similarly, more points may be assigned to that bin). Further, acceleration signals that are below a threshold acceleration magnitude might result in no points being awarded to any bins. Additionally, in some cases, the bins adjacent to a matching bin may also receive points when the matching bin receives points. In this situation, however, the weighting of the points (or number of points) applied to the adjacent bins may be reduced as compared to the weighting of the points (or number of points) received by the matching bin, such as to provide for a linear decay from the center (matching) bin. When the value of the scoring points (e.g., the points score) in one of the bins exceeds a threshold value, the relative heading corresponding to that bin may be selected as the current selected relative heading of the UAV 102.

In the illustrated example, as the user 302 moves the UAV 102 back and forth, as indicated by the arrow 304, points may be added to the various bins. For instance, suppose that lines 308, 310, and 312 indicate acceleration readings that are below a minimum acceleration magnitude threshold and do not result in points being added to respective bins. Further, suppose that bin 314 has received the largest number of points and has a points score that has exceeded the point threshold, while adjacent bins 316 have also received points, but not as many as bin 314. Accordingly, in this example, the yaw angle represented by bin 314 is used as the initial relative Nav frame heading of the UAV 102. After the initial relative heading has been determined in the Nav frame, the UAV 102 may be pointed in any desired direction for takeoff or after takeoff, and the IMU onboard the UAV 102 may be used to track the change in yaw angle and the UAV 102 is able to determine the current relative heading accordingly.

When the relative heading between the Nav frame and the world frame has been determined, the UAV 102 may transform the Nav frame heading to the world frame to determine a heading of the UAV 102 in the world frame 110, e.g., as discussed above with respect to FIGS. 1 and 2. Subsequently, for takeoff, the UAV 102 may then be placed on the ground, held in the hand of the user 302, placed on a support, or the like, pointed in any desired direction, and the UAV 102 is able to automatically track any changes in the relative heading before and after takeoff. Accordingly, after takeoff, the UAV 102 is able to continue to track its heading and perform autonomous navigation based on inputs from the IMU and the GNSS receiver.

In some examples, the UAV 102 may use one or more onboard navigation cameras, light sensors, or the like, to detect that there is insufficient light for navigation with the onboard navigation cameras. For instance, based in part on the exposure settings of the onboard cameras, the UAV 102 may determine there is insufficient light for camera-based navigation, and may automatically switch to navigation that relies solely on the GNSS receiver and the IMU, and, in some examples, a barometer. In some cases, the UAV 102 may make this determination prior to takeoff, and may notify the user 302, such as via any suitable audio or visual techniques. For example, the UAV 102 may signal the user 302, such as via a user interface (UI) on a controller, an LED on the UAV 102, a sound emitted from the UAV 102, which may include voice commands, or the like, indicating that navigation via cameras is not available and that a prescribed initiation sequence may be performed prior to takeoff or during takeoff.

Figure 4:
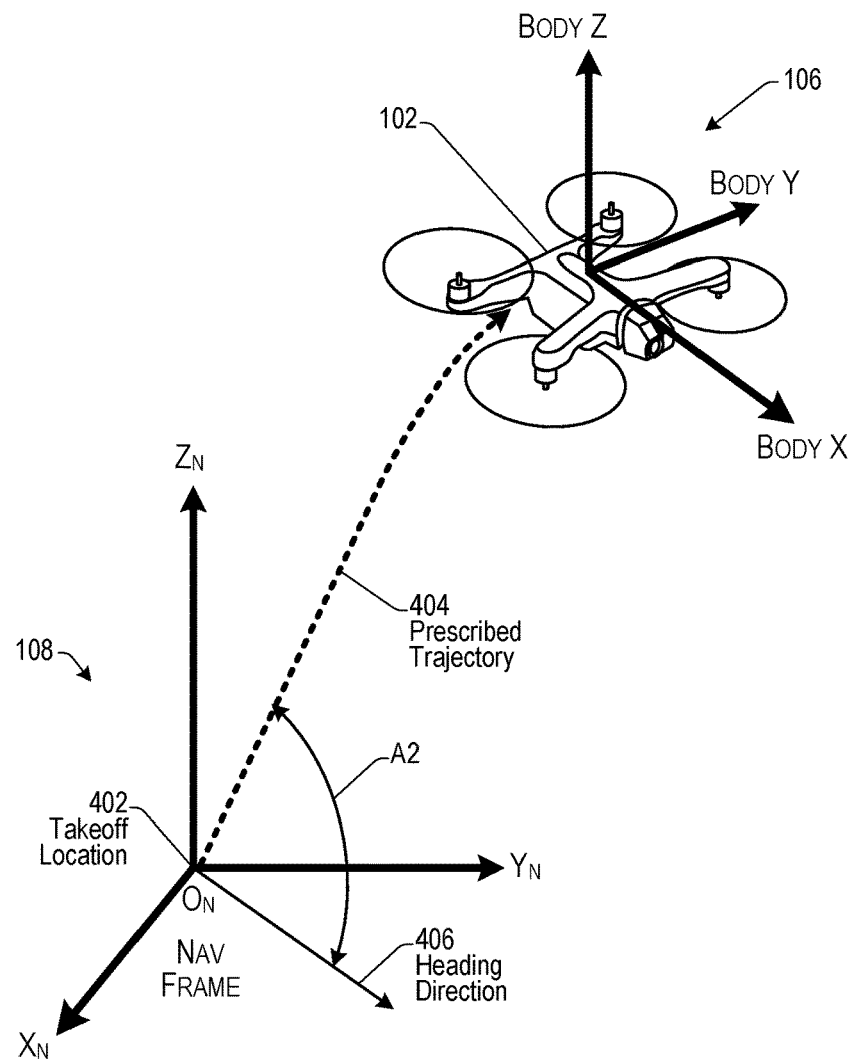
FIG. 4 illustrates an example of initializing a UAV in preparation for navigation without use of navigation cameras or a magnetometer according to some implementations.

FIG. 4 illustrates an example 400 of initializing a UAV 102 in preparation for navigation without use of navigation cameras or a magnetometer according to some implementations. For instance, rather than having a user perform a manual initialization of the UAV 102, the UAV 102 may be programmed to determine the relative heading between the Nay frame 108 and the world frame 110. In the illustrated example, the UAV 102 may be programmed to takeoff at a known acceleration profile, i.e., accelerating at a given acceleration for a given amount of time. For instance, the UAV 102 may have been previously programmed to perform the takeoff sequence and based on the takeoff sequence matching a prescribed angle of ascent A2 (or other prescribed trajectory) and a prescribed acceleration, the algorithm described with respect to FIGS. 5 and 6 below may be applied during the initial takeoff of the UAV 102 for determining the relative heading of the UAV 102 as the UAV 102 is taking off.

In this example, the origin of the Nay frame 108 may correspond to the takeoff location as indicated at 402. Accordingly, in this example, the UAV 102 may ascend according to a prescribed diagonal trajectory 404 for a prescribed distance that may be sufficient to enable the heading direction 406 of the UAV 102 to be determined with sufficient certainty. In some cases, the heading in the Nay frame 108 may be held constant during the takeoff. After the relative heading between the Nay frame 108 and the world frame 110 has been determined with sufficient certainty, the UAV 102 may begin autonomous navigation based on the initially determined relative heading and additional received inputs from the GNSS receiver and the IMU. In the case that the relative heading between the Nay frame 108 and the world frame 110 is not determined with sufficient certainty during the takeoff sequence, the UAV 102 may be configured to automatically land or otherwise return as near as possible to the takeoff location 402.

Furthermore, while two examples of techniques for orienting the UAV 102 based on movement of the UAV 102 prior to the UAV 102 performing an autonomous navigation routine have been described above, numerous other variations will be apparent to those of skill in the art having the benefit of the disclosure herein. For example, the UAV 102 may be mounted on a mechanical arm or the like that is able to induce the sufficient motion in the UAV 102 in a controlled manner, as discussed additionally below with respect to FIG. 10. Additionally, in some examples, as discussed below with respect to FIG. 10, rather than taking off from the ground or the hand of a user, the UAV 102 may takeoff from the arm of a docking station or the like. As still another example, rather than taking off in a diagonal trajectory, the UAV 102 may takeoff in a spiral trajectory or other selected type of trajectory. Accordingly, implementations herein are not limited to the examples illustrated in the drawing figures.

Figure 5:
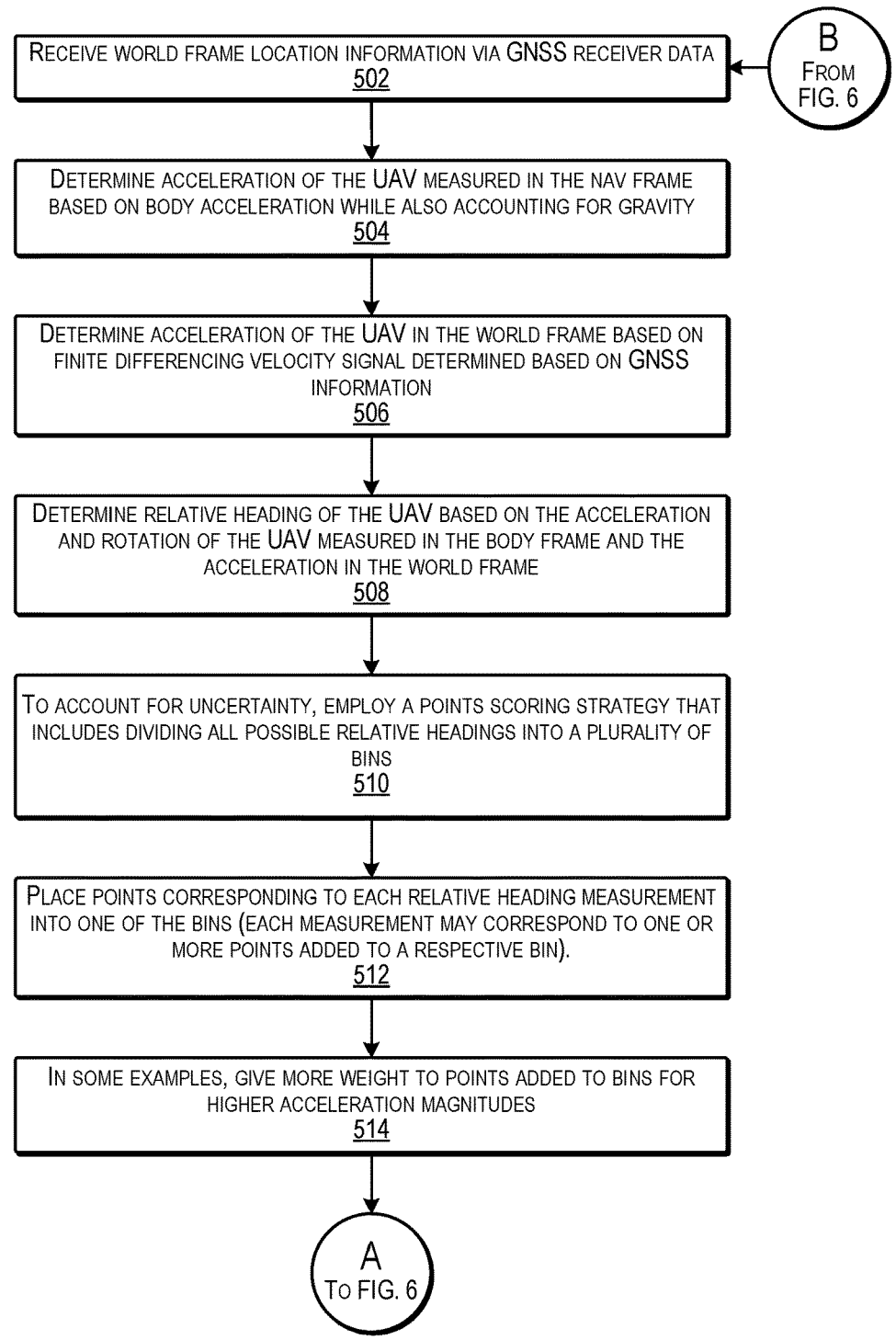
FIG. 5 is a flow diagram illustrating an example process for enabling low-light and no-light navigation according to some implementations.
Figure 6:
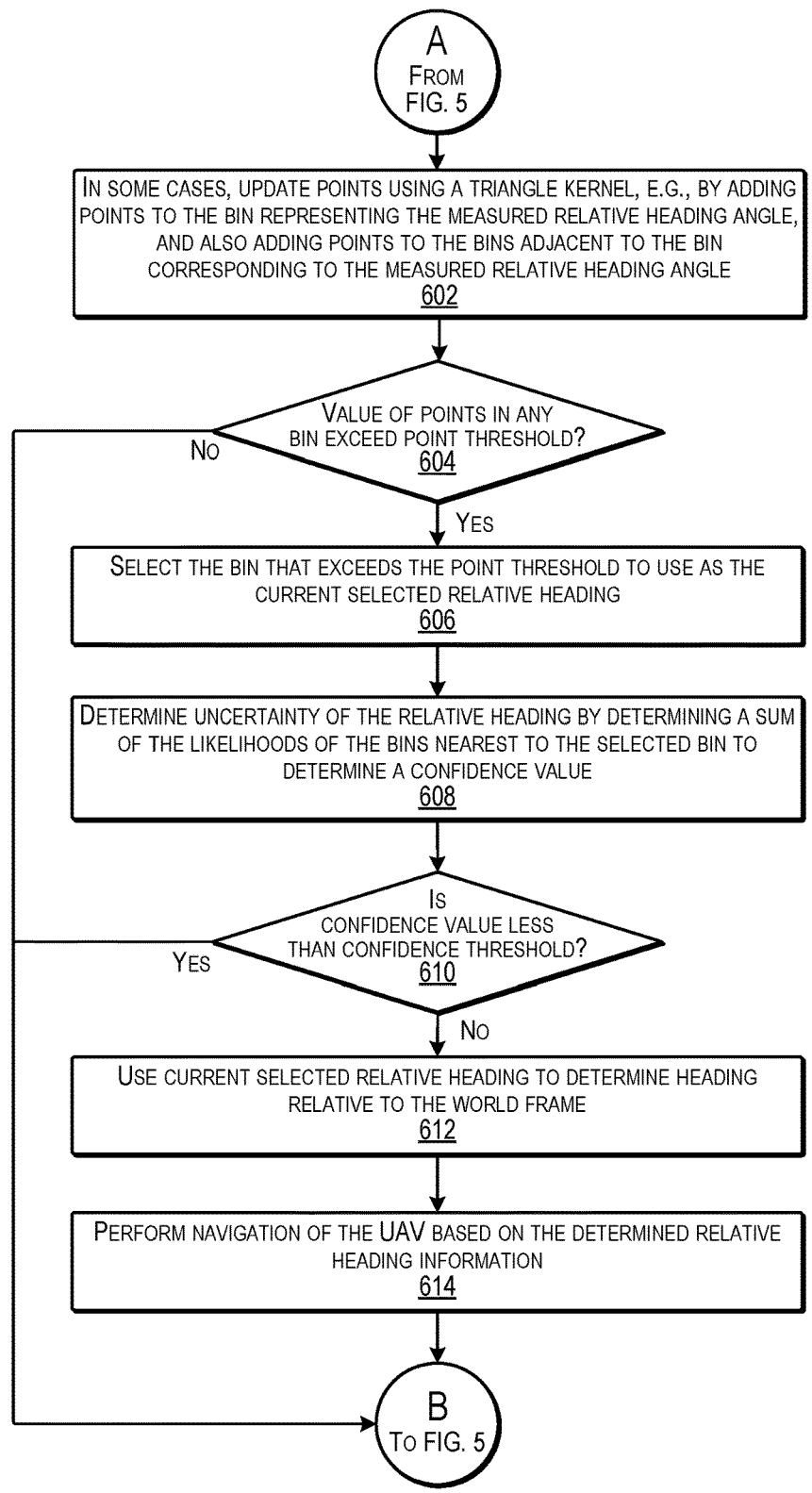
FIG. 6 is a flow diagram illustrating a continuation of the example process of FIG. 5 according to some implementations.

FIGS. 5 and 6 include flow diagrams illustrating an example process 500 according to some implementations. The process is illustrated as a collection of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, systems, and devices described in the examples herein, although the process may be implemented in a wide variety of other environments, systems, and devices.

FIG. 5 is a flow diagram illustrating part of the example process 500 for enabling low-light and no-light navigation according to some implementations. FIG. 6 is a flow diagram illustrating a continuation of the example process 500 according to some implementations. In some examples, at least a portion of the process 500 may be executed by the UAV 102, such as by executing a UAV control program and/or other algorithms as discussed additionally below. In some examples, the process 500 may be performed before or during takeoff of the UAV 102 to establish an initial relative heading of the UAV 102 between the Nay frame and the world frame, which will enable navigating the UAV 102 using world frame measurements, by transforming them into the navigation frame using the relative heading. Furthermore, after the initial relative heading has been determined, the process 500 may be continued to be executed to enable the UAV 102 to navigate autonomously without relying on inputs from navigation cameras and/or a magnetometer, such as may occur in low-light or no-light situations and/or in situations in which a magnetometer reading may be unreliable.

At 502, the UAV 102 may receive GNSS information indicating a current location of the UAV. For example, the UAV 102 may receive an indication of latitude, longitude and altitude in the world frame via the onboard GNSS receiver.

At 504, the UAV may receive, from the IMU, acceleration inputs indicating acceleration of the UAV 102 and rotational inputs indicating rotation of the UAV 102 with respect to a prior attitude of the UAV 102. As one example, when initializing the UAV 102 relative heading prior to takeoff, a user may manually move the UAV 102 back and forth such as through a controlled motion of the UAV 102, to determine an initial relative heading of the UAV 102. As another example, the UAV 102 may be configured to take off in a controlled motion, such as at a prescribed trajectory and acceleration profile for determining the initial relative heading. For instance, the UAV 102 may takeoff in a known direction, e.g., diagonally to the ground plane at an angled ascent at a known angle and known acceleration. In this case, the UAV 102 may initialize its heading in the Nav frame and the world frame, and proceed with a programmed autonomous navigation course. If the UAV 102 does not initialize correctly during takeoff, the UAV 102 may be configured to return to the takeoff location automatically, and the initialization process may be repeated. During the initialization of the relative heading, a gravity vector may be taken into account when determining the acceleration components of the UAV 102 in the Nav frame 108. Furthermore, following determination of an initial heading of the UAV 102, the acceleration and rotational inputs from the IMU may continue to be used along with the GNSS location information for enabling the UAV 102 to continue to navigate itself without relying on navigation cameras or a magnetometer.

At 506, the UAV 102 may determine the acceleration of the UAV 102 in the world frame based on finite differencing a velocity signal determined based on GNSS information. For example, the acceleration in the world frame may be determined based on determining a finite difference for the velocity signals determined through sequentially received GNSS location data. For example, the GNSS data may be received multiple times per second such as at a rate of 8 hertz, 16 hertz, or the like. The velocity and acceleration of the UAV 102 in the world frame may be determined based on the sequential location information received via the GNSS receiver. In some examples, a low-pass filter may be applied during this operation to prevent noise in the GNSS data from skewing the results.

At 508, the UAV 102 may determine a relative heading between the Nav frame and the world frame of the UAV based on the acceleration and rotation of the UAV measured in the Nav frame and the acceleration of the UAV determined in the world frame. For example, the relative heading may represent the rotation between the Nav frame and the world frame. In other words, the UAV 102 may compute the relative heading of the UAV 102 by determining the difference between the Nav frame heading and the world frame heading. For example, the heading of the UAV 102 in the Nav frame may be determined from the Nav rotation relative to the body frame based on the output of the IMU. As one example, the acceleration outputs determined from the IMU indicate the acceleration of the UAV 102 in the body frame, and the rotation information determined from the IMU (based on the gyroscope) may be used to transform the acceleration of the vehicle in the body frame to the Nav frame. Further, the heading angle in the world frame may be determined based on the accelerations determined for $X_W$ and $Y_W$ from the GNSS data. Therefore, the relative heading may be determined based on the world frame angle and the Nav frame angle, e.g., by determining the difference between the two. In some examples, the algorithm may further ensure that the determined relative heading is an angle between 0 and 2 pi. Accordingly, the relative heading between the Nav frame and the world frame may subsequently be used to determine the heading of the UAV 102 relative to the world frame as discussed additionally below. However, each of these measurements of the relative heading may have noise and therefore individual measurements are not relied on in some examples herein due to the uncertainty caused by the noise. Thus, as discussed below, a plurality of relative heading measurements may be sampled to determine a selected relative heading with greater certainty.

At 510, to account for the uncertainty, the UAV 102 may employ a points scoring strategy that includes dividing all possible relative headings into a plurality of bins. As one non-limiting example, 180 bins may be used, with each bin representing 2 degrees in a range of angles from 0 to 360 degrees, although other numbers of bins and respective ranges may be used in other examples.

Figure 7:
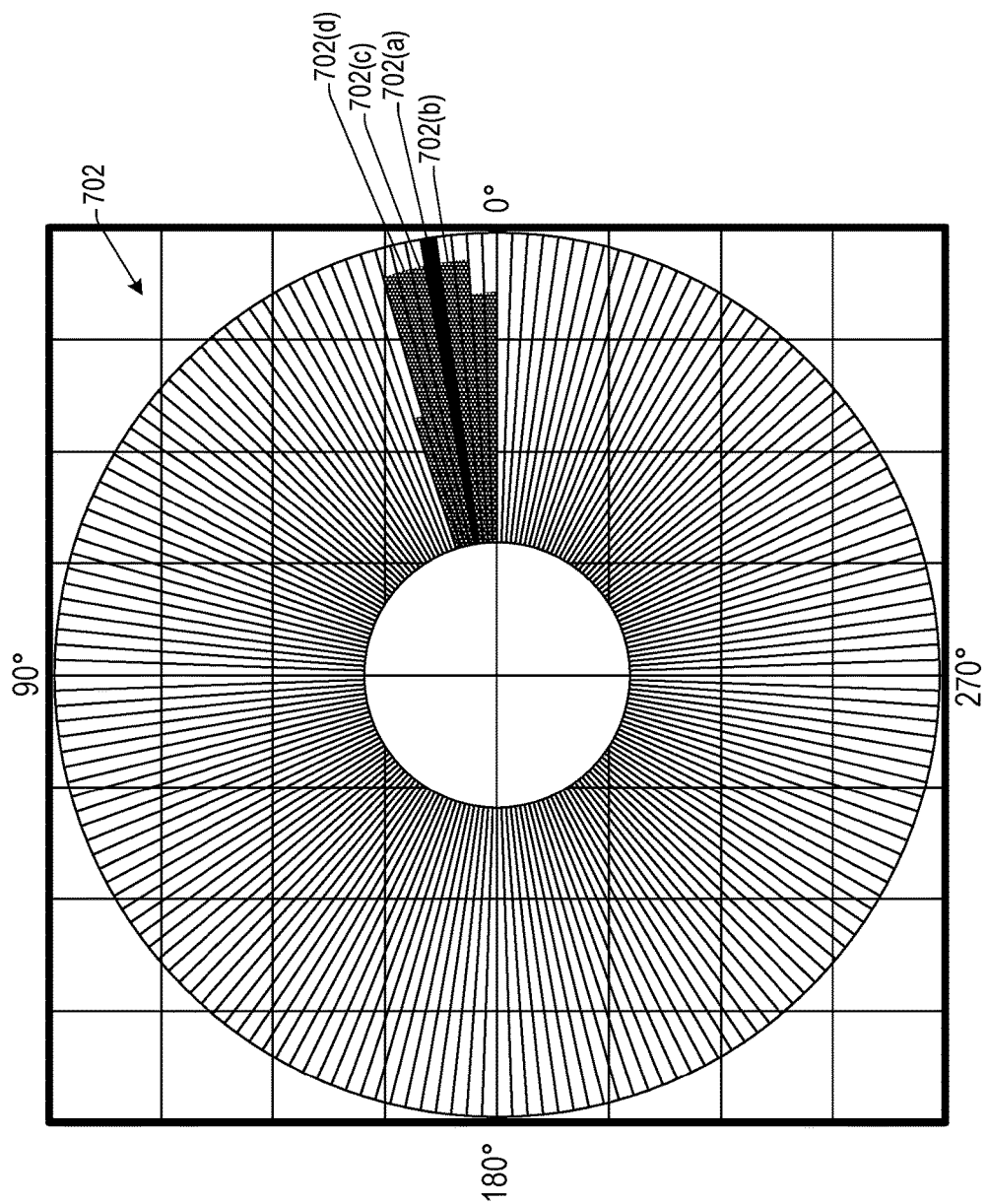
FIG. 7 illustrates an example mapping of bins that may be used for points scoring for determining a relative heading of the UAV according to some implementations.

FIG. 7 illustrates an example mapping 700 of bins that may be used for points scoring for determining a relative heading of the UAV according to some implementations. As mentioned above, in this example, the possible range of relative headings is between zero and 360 degrees. The example of FIG. 7 includes 180 bins 702, with each bin 702 representing 2 degrees in the range from 0 to 360 degrees. Each time a relative heading is determined at block 512 above, one or more points may be added to a bin corresponding to the determined relative heading angle. Accordingly, individual bins may progressively accumulate points. As one example, more points (or more heavily weighted points) may be added to a bin when the relative heading is determined based on higher acceleration magnitudes, as higher acceleration magnitudes tend to be more accurate than lower acceleration magnitudes. Furthermore, if the magnitude of acceleration used for determining a particular relative heading measurement is below a minimum threshold magnitude, the measurement may be ignored, and no points might be added to the corresponding bin. In addition, in some cases, more than a single bin may receive points for each determined relative heading. For example, a triangle kernel model may be used such that points are added to a bin representing the measured relative heading angle and points may also be added to the bins adjacent to the matching bin. However, the points added to the adjacent bins may be lower in number or weighted less heavily corresponding to a linear decay from the center bin.

In the illustrated example, more points (and/or more heavily weighted points) have been added to bin 702(*a*), while adjacent bins, such as 702(*b*), 702(*c*), 702(*d*), etc., have also received points. Furthermore, in this example, suppose that bin 702(*a*) has received sufficient points such that the value of the points (e.g., a total points score) exceeds a point threshold, thereby indicating that the angle corresponding to bin 702(*a*) is the current selected relative heading of the UAV 102.

Returning to FIG. 5, at 512, the UAV 102 may place points corresponding to each relative heading measurement into one of the bins. For example, as mentioned above, each relative heading measurement may correspond to one or more points added to a respective bin corresponding to that particular relative heading angle.

At 514, the UAV 102 may give more weight to points added to (or may give more points to) bins for higher acceleration magnitudes. Similarly, if the magnitude of an acceleration used for determining the particular relative heading measurement is below a minimum threshold magnitude, the measurement may be ignored, and no points might be added to the corresponding bin.

Moving to FIG. 6, at 602, in some cases, the UAV 102 may add points to bins using a triangle kernel, e.g., by adding points to the bin representing the relative angle of the measured relative heading, and also adding points to the bins adjacent to the bin matching the relative heading angle. For example, the value of points added to the adjacent bins may be less than the value of points added to the matching bin.

At 604, the UAV 102 may determine whether the value of points in any bin exceeds a threshold point value. If so, the process goes to 606. If not, the process goes to block B to return to block 502 of FIG. 5 to process additional location, acceleration and rotation data.

At 606, the UAV 102 may select the bin that exceeds the point threshold to use as the current selected relative heading. For example, the points accumulated in the selected bin may exceed a bin points threshold. The threshold may be determined empirically and may be sufficiently high to ensure reasonable confidence in the selected bin.

At 608, the UAV 102 may determine uncertainty of the selected relative heading by determining a sum of the likelihoods of the bins nearest to the selected bin to determine a confidence value. For example, the UAV 102 may select the bin with highest likelihood based on the points scoring system discussed above, but may also determine the number of points in some number of bins adjacent to the selected bin. The UAV 102 may use the sum of the likelihoods near the most likely bin to the total (1.0) to determine a confidence value, and then determine a sigma by using this confidence value to scale between a minimum and maximum sigma, such as based on linear interpolation.

At 610, the UAV 102 may determine whether the confidence value is less than a confidence threshold. If not, the process goes to 612. If so, the process goes to block B to return to block 502 of FIG. 5 to process additional location, acceleration and rotation data.

At 612, when the confidence value exceeds the confidence value threshold, the determined current selected relative heading may be used for navigation, and the UAV 102 may use the current selected relative heading to determine a heading for the UAV 102 relative to the world frame.

At 614, the UAV 102 may perform navigation of the UAV 102 based on the determined relative heading information. For example, the determined heading information, e.g., the current world frame heading and/or the selected relative heading may be provided to a processor executing a navigation algorithm and/or to a flight controller onboard the UAV 102. For instance, as mentioned above, in some cases the heading relative to the world frame may be determined for the UAV 102 prior to or during takeoff of the UAV 102. For instance, with the above algorithm, the UAV 102 is able to compute the heading of the UAV 102 in the world frame based on acceleration and rotational measurements. Determining the relative heading of the UAV 102 may be dependent on imparting sufficient motion to the UAV 102 to cause one of the bins to accumulate sufficient points to exceed the points threshold as discussed above. Accordingly, as discussed above, e.g., with respect to FIGS. 3 and 4, the user may impart sufficient motion by moving the UAV 102 side to side until the system has enough points in one of the bins to be confident about the relative heading. Alternatively, the UAV 102 may move itself in a known acceleration profile for performing this function. If the confidence level of the relative heading is below the confidence threshold, in some examples, the UAV 102 may be configured to not take off (in the case of manual initialization before takeoff) or to land immediately (in the case of auto initialization during takeoff), and the process of initialization may be repeated, or an alternative process of initialization may be attempted.

In other examples, the current world frame heading may be used for autonomous navigation during and following takeoff. For example, the initial determined world frame heading may be used to initialize an Extended Kalman Filter that may be used to estimate the state of the UAV 102. Once in flight, the relative heading determination may be applied as a measurement to the Extended Kalman Filter. If the relative heading estimate is uncertain, i.e., below the confidence threshold, that relative heading is not applied as a measurement to the Extended Kalman Filter. Kalman filters are commonly applied in the areas of aircraft navigation, guidance, and controls.

Further, there may be several other system checks that may be performed by the UAV 120 before the UAV 120 takes off. For example, these system checks may include having sufficient GNSS signal quality, ensuring that the relative heading estimation has converged with sufficient confidence, determining that the UAV 102 is sufficiently immobile prior to takeoff, and so forth.

In addition, as one example, the points added to the bins may timeout after a predetermined time and as new points are added to the bins. Alternatively, as another example, the points may be cleared from all the bins when one of the bins exceeds the threshold point level within a threshold confidence, and the emptied bins may begin accumulating new points from that time forward. Accordingly, in either example, the UAV 102 may continually update the relative heading based on more recent GNSS information received via the GNSS receiver and more recent acceleration and rotation information received from the IMU.

Figure 8:
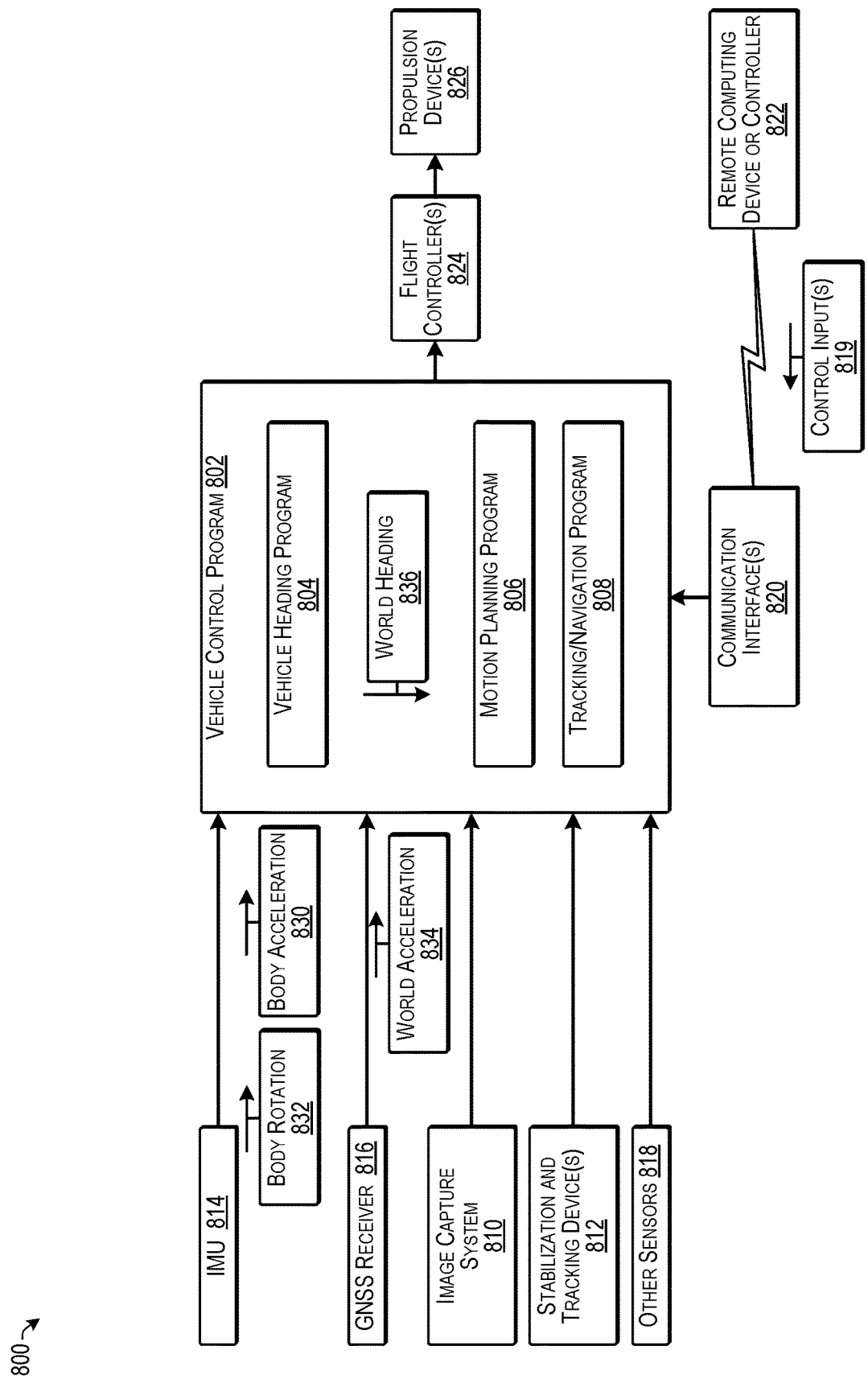
FIG. 8 illustrates an example logical configuration of a vehicle control program that may be executed by the UAV according to some implementations.

FIG. 8 illustrates an example logical configuration 800 of a vehicle control program 802 that may be executed by the UAV 102 according to some implementations. For instance, the vehicle control program 802 may be executed by one or more processors (not shown in FIG. 8) of the UAV 102 for receiving inputs from any number of systems, sensors, and the like, for controlling the UAV 102. For example, the vehicle control program 802 may be implemented as instructions stored in memory or other computer readable media and executable by the one or more processors.

As illustrated in FIG. 8, the vehicle control program 802 may include a vehicle heading program 804, a motion planning program 806, and a tracking and/or navigation program 808; although more or fewer programs and modules may be included in the vehicle control program 802 in other examples. The vehicle heading program 804 may be configured to determine the heading of the UAV 102 such as using techniques and algorithms discussed above, e.g., with respect to FIGS. 1-7. The motion planning program 806 may be executed to configure the UAV 102 for autonomously maneuvering the UAV 102 through a physical environment. Furthermore, the tracking and/or navigation program may determine one or more objectives of the UAV 102 during flight, such as for determining a destination of the UAV, determining an object to be tracked by the UAV 102, performing tracking of a tracked object in the physical environment, performing mapping or scanning operations, and/or for performing various other objectives determined for the UAV 102.

In some examples, the tracking/navigation program 808 may include image processing capabilities, object detection and tracking algorithms, identity recognition algorithms, and so forth (all not shown). Furthermore, in some implementations, one or more of the vehicle heading program 804, the motion planning program 806, and/or the tracking/navigation program 808 may be separate programs, rather than combined into the vehicle control program 802.

In some implementations, the motion planning program 806 may be executed to generate a planned trajectory through a three-dimensional (3D) space of a physical environment. For instance, when sufficient light is available, the planned motion of the UAV 102 may be based in part on images received from an image capture system 810, which may include one or more navigation cameras and/or tracking cameras (not shown in FIG. 8). However, in some implementations herein, lighting conditions in the external environment may not be sufficient to enable navigation or tracking using the cameras of the image capture system 810. Accordingly, the vehicle heading program 804 and the motion planning program 806 may rely on information received from other sensors and devices such as stabilization and tracking devices 812, IMU 814, GNSS receiver 816, and/or other sensors 818, such as a barometer, proximity sensors, and so forth.

Furthermore, in some examples, the vehicle control program 802 may receive, one or more control inputs 819 from external sources (e.g., from a remote user using a controller, from a remote navigation application executing on a remote computing device, etc.) through one or more communication interfaces 820, which may set forth one or more specified navigation objectives. For instance, the control input(s) 819 may include calls to via an application programming interface (API) associated with the vehicle control program 802. For example, the API calls may be made by an application executing on a remote computing device or controller 822 for setting one or more navigation objectives as part of the motion planning process. Navigation objectives may include, for example, avoiding collision with other objects, maneuvering to follow a particular object, maneuvering to a specified location, traversing a specified area or the like. In some implementations, the generated planned trajectory is continuously or continually (i.e., at regular or irregular intervals) updated based on new inputs (e.g., new sensor data and/or new control inputs received via the communication interfaces 820 as the UAV 102 autonomously navigates the physical environment.

In some implementations, the vehicle control program 802 may generate control commands configured to cause the UAV 102 to maneuver along the planned trajectory generated by the motion planning program 806. For example, the control commands may be provided to one or more flight controllers 824 for controlling one or more propulsion devices 826 (which may correspond in some examples to the propulsion devices 105 discussed above with respect to FIG. 1). For instance, the propulsion devices may include one or more motors, rotors, objects, and corresponding vehicle control actuators that may be controlled to cause the UAV 102 to maneuver along the planned 3D trajectory.

The tracking/navigation program 808, operating separately or in conjunction with the motion planning program 806, may be configured to determine navigation functions such as for tracking one or more objects in the physical environment based, for example, on received images or other received sensor information, and/or based on one or more control inputs from the remote computing device or a remote controller, and/or based on one or more specified navigation objectives.

The tracking/navigation program 808 may communicate with the motion planning program 806, for example, to maneuver the UAV 102 based on measured, estimated, and/or predicted positions, orientations, and/or trajectories of objects, structures, and landmarks in the physical environment. For example, the tracking/navigation program 808 may communicate a navigation objective to the motion planning program 806 to cause the motion planning program 806 to determine a suitable flight path for achieving the navigation objective.

In some implementations, tracking/navigation program 808 may be further configured to generate control commands configured to cause one or more stabilization/tracking devices 812 to adjust an orientation and/or position of any image capture devices relative to the body of the UAV 102 based on the motion of the UAV 102 and/or the tracking of one or more objects. Such stabilization/tracking devices 812 may include a mechanical gimbal or a hybrid digital-mechanical gimbal, etc. For example, while tracking an object in motion relative to the UAV 102, the stabilization and tracking devices 812 may adjust an orientation of a camera so as to keep the tracked object centered in the field of view (FOV) of the image capture device while the UAV 102 is in motion.

As discussed above with respect to FIGS. 1-7, the vehicle heading program 804 may determine an initial vehicle heading before or during takeoff, and may continually determine subsequent vehicle headings during flight of the vehicle, such as to enable navigation in no-light or low-light conditions. Thus, the IMU 814 may provide a body acceleration 830 and a body rotation 832 to the vehicle heading program 804. Further, the GNSS receiver may provide sequential location data to the vehicle heading program 804 for determining a world acceleration 834. Based on the data 830-834, as discussed above with respect to FIGS. 1-7, the vehicle heading program 804 may determine the relative heading between the Nay frame and the World frame, and may use that to determine a world heading of the UAV 102 in the world frame. For example, the world heading 836 may be provided to the motion planning program, the track/navigation program and/or the flight controller(s) 824.

The UAV 102 illustrated in FIGS. 1, 3 and 4 is an example provided for illustrative purposes. A UAV 102 in accordance with the present teachings may include more or fewer components than are shown. For example, while a quadcopter is illustrated, the UAV 102 is not limited to any particular configuration and may include hexacopters, octocopters, fixed wing aircraft, or any other type of independently maneuverable aircraft, as will be apparent to those of skill in the art having the benefit of the disclosure herein. Furthermore, while techniques for controlling the navigation of an autonomous UAV 102 based on inputs from an IMU and GNSS receiver in low-light and no-light situations without input from a magnetometer are described, the described techniques may similarly be applied to guide navigation by other types of vehicles (e.g., fixed-wing aircraft, automobiles, watercraft, etc.).

Further, the processing by the vehicle control program 802 to effect the autonomous behavior of the UAV 102 can be abstracted into one or more objectives. An objective in this context may include any sort of defined goal or target configured to guide an autonomous response by the UAV 102. For example, objectives may be configured to approximate certain intentions of a human pilot or other user or operator of the UAV 102. A system in accordance with the present disclosure may be based on fewer or more objectives than are described.

Figure 9:
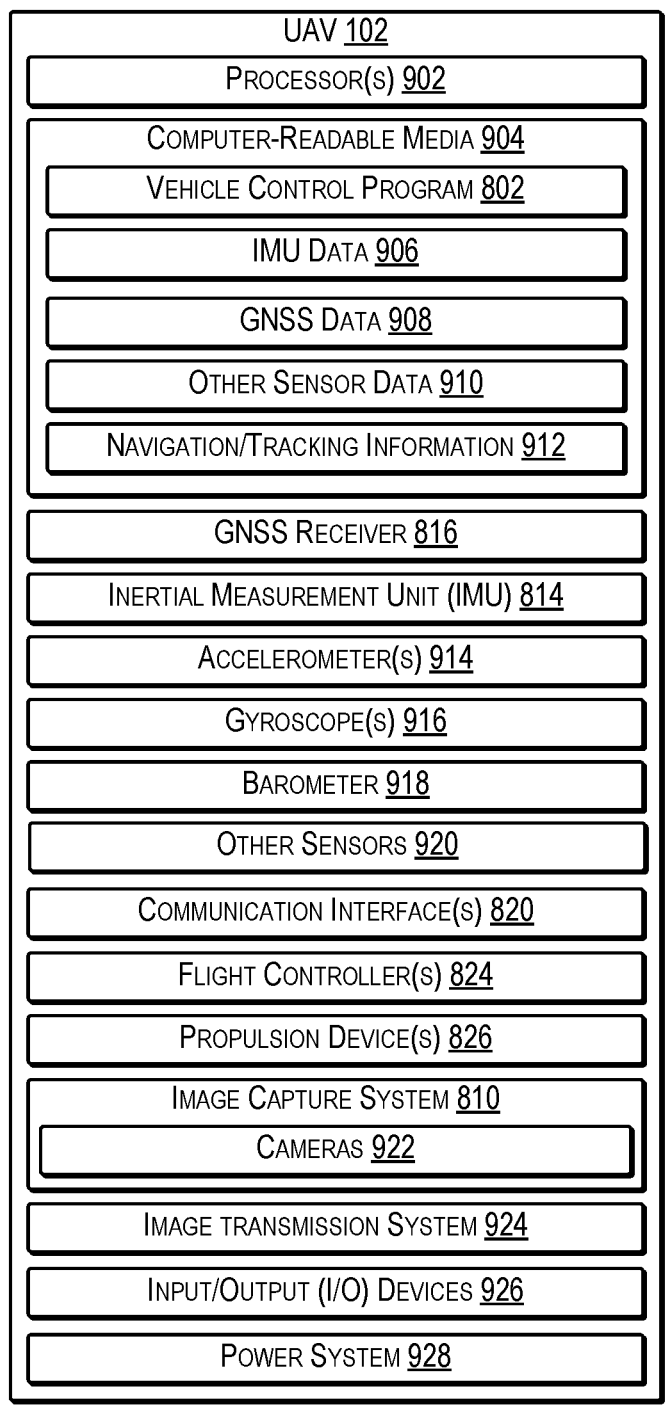
FIG. 9 illustrates select components of an example UAV according to some implementations.

FIG. 9 illustrates select components of an example UAV 102 according to some implementations. A UAV 102, according to the present teachings, may be implemented as any type of unmanned aerial vehicle. For instance, a UAV, sometimes referred to as a drone, may be generally defined as any aircraft capable of controlled flight without a human pilot onboard. UAVs may be controlled autonomously by onboard computer processors or via remote control by a remotely located human pilot. Similar to an airplane, some types of UAVs may utilize fixed aerodynamic surfaces along with a propulsion system (e.g., propellers, jets, etc.) to achieve lift and navigation. Alternatively, similar to helicopters, UAVs may directly use a propulsion system (e.g., propellers, jets, etc.) to counter gravitational forces and achieve lift and navigation. Propulsion-driven lift (as in the case of helicopters) offers significant advantages in certain implementations because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control may be achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis may be zero. Provided the four rotors spin at sufficient angular velocity to provide a vertical thrust equal to the force of gravity, the quadcopter can maintain a hover.

An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on a horizontal plane.

The UAV 102 herein may include one or more processors 902 and one or more computer readable media 904. For example, the one or more processors 904 may execute software, instructions, or the like, for controlling the navigation and other functions of the UAV 102. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, or any other medium that can be used to store the desired information and that can be accessed by a computing device. Depending on the configuration, the computer-readable media 904 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 904 may be used to store any number of functional components that are executable by the processor(s) 1302. In many implementations, these functional components comprise instructions or programs that are executable by the processors 902 and that, when executed, specifically configure the one or more processors 902 to perform at least some of the actions attributed above to the UAV 102. Functional components stored in the computer-readable media 904 may include the vehicle control program 802, e.g., as discussed above with respect to FIG. 8.

In addition, the computer-readable media 904 may store data used for performing the operations described herein. Thus, the computer-readable media 1304 may store, at least temporarily, IMU data 906, GNSS data 908, other sensor data 910, and navigation/tracking information 912 which may set forth or otherwise indicate at least one objective for the UAV 102 to achieve during autonomous operation. In addition, the UAV 102 may include many other logical, programmatic, and physical components, of which those described above are merely examples that are related to the discussion herein.

UAV 102 may further include the GNSS receiver 816, the IMU 814, one or more accelerometers 914, at least some of which may be associated with the IMU 814, and one or more gyroscopes 916, at least some of which may also be associated with the IMU 814. In addition, the UAV 102 may include a barometer 918 and other sensors 920, which may include proximity sensors or any of various other types of sensors as is known in the art. Furthermore, the UAV 102 may include the one or more communication interfaces 820, one or more flight controllers 824, one or more propulsion devices 826, the image capture system 810, one or more cameras 922, an image transmission system 924, and input/output (I/O) devices 926. These components may be able to communicate at least with the one or more processors 902, such as over one or more communication buses, signal lines, or the like (not shown).

The UAV 102 may include more or fewer components than shown in the example of FIG. 9, may combine two or more components as functional units, or may have a different configuration or arrangement of the components. Some of the various components of the example UAV 102 shown in FIG. 9 may be implemented in hardware, software or a combination of both hardware and software, including one or more signal processing and/or application specific integrated circuits. Also, UAV 102 may include an off-the-shelf UAV (e.g., a currently available remote-controlled quadcopter) coupled with a modular add-on devices, additional processors 902, additional computer readable media 904, or the like to perform the innovative functions described in this disclosure.

As described earlier, the propulsion devices 826 may comprise fixed-pitch rotors. The propulsion devices 826 may additionally or alternatively include variable-pitch rotors (for example, using a gimbal mechanism), a variable-pitch jet engine, or any other mode of propulsion device and associated actuators having the effect of providing force. The propulsion devices 826 may include a means for varying the applied thrust, for example, via an electronic speed controller controlled by or included in the flight controller 824 for varying the speed of each fixed-pitch rotor.

Flight controller 824 may include a combination of hardware and/or software configured to receive input data (e.g., sensor data, image data, generated trajectories, or other instructions from the vehicle control program 802), interpret the data/instructions and output control commands to the propulsion devices 826 of the UAV 102. Alternatively, or in addition, the flight controller 824 may be configured to receive control commands generated by another component or device (e.g., processors 902 and/or a remote computing device or controller), interpret those control commands and generate control signals to the propulsion devices 826 of the UAV 102. In some implementations, the previously mentioned vehicle control program 802 of the UAV 102 may comprise the flight controller 824 and/or any one or more of the other components of the UAV 102. Alternatively, the flight controller 824 may exist as a component separate from the vehicle control program 802.

The communication interface(s) 820 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some implementations, the communication interface(s) 820 may include RF circuitry. In such implementations, RF circuitry may convert electrical signals to/from electromagnetic signals and communicate with communications networks and other communications devices via the electromagnetic signals. The RF circuitry may include known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communications networks (including public, private, local, and wide area). For example, communication may be over a wide area network (WAN), a local area network (LAN), or a network of networks such as the Internet.

Communication may be facilitated over wired transmission media (e.g., via Ethernet) or wirelessly. Wireless communication may be over a wireless cellular telephone network, a wireless local area network (LAN, e.g., Wi-Fi) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11n and/or IEEE 802.11ac), voice over Internet Protocol (VoIP), Wi-MAX, or any other suitable communication protocols.

The communication interface(s) 144 may include one or more interfaces and hardware components for enabling communication with various other devices, such as over the network(s) 106. For example, communication interface(s) 144 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein. For example, 900 MHz, 2.4 GHz and 5.8 GHz are the most common radio frequencies used for communicating with UAVs, but implementations herein are not limited to any particular frequency.

The input/output (I/O) devices 926 may include physical buttons (e.g., push buttons, rocker buttons, etc.), LEDs, dials, displays, touch screen displays, speakers, and so forth, that may be used to interact with, or otherwise operate certain features of the UAV 102. The UAV 102 also includes a power system 928 for powering the various components. The power system 928 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV 102 may also include one or more cameras 922 as image capture devices. The cameras 922 may include one or more optical sensors for capturing images (including still images and/or video). In some implementations, the UAV 102 may include some cameras 922 dedicated for image capture of a subject and other cameras dedicated for image capture for visual navigation (e.g., through visual inertial odometry). The image transmission system 924 may be configured to transmit captured video in real time to a remote computing device or the like.

UAV 102 may include one or more of the IMUs 814. The IMU 814 may measure and report the velocity, acceleration, orientation, and gravitational forces on the UAV 102, such as by using a combination of the gyroscopes 916 and accelerometers 914. As one example, the IMU 814 may be configured to detect linear acceleration using one or more accelerometers and to detect rotation using one or more gyroscopes. In some cases, the IMU 814 may be a self-contained system with a three-axis gyroscope, a three-axis accelerometer, and an embedded processor for processing inputs from the gyroscope and the accelerometer for providing an output of acceleration, attitude, and the like.

UAV 102 may include the GNSS receiver 816, such as a GPS receiver or the like. The GNSS receiver 816 may receive signals from GNSS satellites in orbit around the Earth, calculate a distance to each of the GNSS satellites, and thereby determine a current global position of UAV 102. The other sensors 920 may include proximity sensors, radar, sonar, LIDAR, and so forth.

Figure 10:
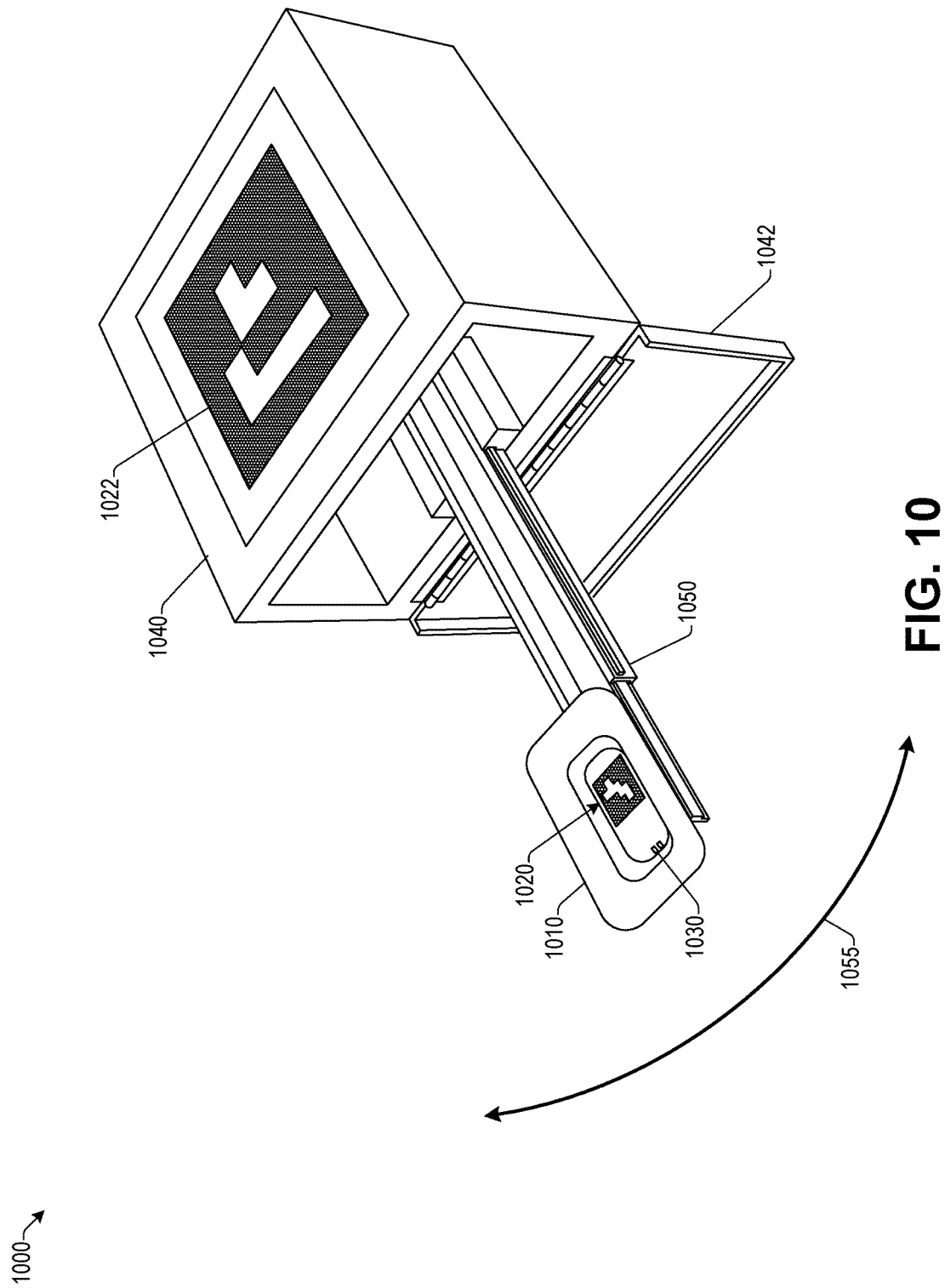
FIG. 10 illustrates an example of a dock that may be used for autonomous takeoff and landing of the UAV according to some implementations.

FIG. 10 illustrates an example of a dock 1000 that may be used for autonomous takeoff and landing of the UAV 102 according to some implementations. The dock 1000 includes a UAV support surface 1010 with a fiducial 1020 and charging contacts 1030 for a battery charger. The dock 1000 includes a box 1040 in the shape of a rectangular box with a door 1042. The dock 1000 further includes a retractable arm 1050 that supports the UAV support surface 1010 and enables the UAV support surface 1010 to be positioned outside the box 1040 to enable takeoff and landing of the UAV 102, or inside the box 1040, for storage and/or servicing of the UAV 102. The dock 1000 includes a second, auxiliary fiducial 1022 on the outer top surface of the box 1040. The root fiducial 1020 and the auxiliary fiducial 1022 may be detected and used for visual localization of the UAV 102 in relation to the dock 1000 to enable a precise landing on the UAV support surface 1010.

In some examples herein, the arm 1050 and/or the entire dock 1000 may be mounted to enable movement in a horizontal plane, such as to enable back-and-forth rotation, as indicated by arrow 1055, or alternatively back-and-forth translation, or other movement of the UAV 102 sufficient to enable initialization of the relative heading of the UAV 102 in a manner similar to the manual movement performed by the user 302, as discussed above with respect to FIG. 3. Accordingly, the dock 1000 may be configured to automatically initialize the UAV 102 in preparation for flight in low-light or no-light conditions.

The UAV support surface 1010 has a funnel geometry shaped to fit a bottom surface of the UAV 102 at a base of the funnel. The tapered sides of the funnel may help to mechanically guide the bottom surface of the UAV 102 into a centered position over the base of the funnel during a landing. For example, corners at the base of the funnel may serve to prevent the UAV 102 from rotating on the UAV support surface 1010 after the bottom surface of the UAV 102 has settled into the base of the funnel shape of the UAV support surface 1010. The dock 1000 further includes conducting contacts 1030 of a battery charger on the UAV support surface 1010, positioned at the bottom of the funnel. The dock 1000 may include a charger configured to charge the battery while the UAV 102 is on the UAV support surface 1010.

The box 1040 may be configured to enclose the UAV support surface 1010 in a first arrangement (shown in FIG. 4) and expose the UAV support surface 1010 in a second arrangement. The dock 1000 may be configured to transition from the first arrangement to the second arrangement automatically by performing steps including opening a door 1042 of the box 1040 and extending the retractable arm 1050 to move the UAV support surface 1010 from inside the box 1040 to outside of the box 1040.

The dock 1000 includes the retractable arm 1050 and the UAV support surface 1010 is positioned at an end of the retractable arm 1050. When the retractable arm 1050 is extended, the UAV support surface 1010 is positioned away from the box 1040 of the dock 1000, which may reduce or prevent propeller wash from the propellers of the UAV 102 during a landing, thus simplifying the landing operation. The retractable arm 1050 may include aerodynamic cowling for redirecting propeller wash to further mitigate the problems of propeller wash during takeoff and landing. The dock 1000 may enable automated landing and recharging of an unmanned aerial vehicle, such as the UAV 102.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. An unmanned aerial vehicle (UAV) comprising:
a global navigation satellite system (GNSS) receiver;
an inertial measurement unit having an associated accelerometer and gyroscope; and
one or more processors configured by executable instruction to perform operations comprising:
receiving location information via the GNSS receiver;
determining first accelerations of the UAV in a navigation frame of reference based on information from the accelerometer and the gyroscope received prior to or during takeoff;
determining second accelerations of the UAV in a world frame of reference based on the location information received via the GNSS receiver prior to or during takeoff;
determining a plurality of relative headings of the UAV respectively based on the first accelerations and the second accelerations;
selecting one of the plurality of relative headings based on a largest subset of the plurality of relative headings matching each other within a threshold amount; and
performing navigation of the UAV at least one of during or after takeoff of the UAV based on the selected relative heading.

2. The UAV as recited in claim 1, the operations further comprising:
establishing a plurality of bins, each bin corresponding to a range of heading angles;
matching individual relative headings to individual ones of the bins based on matching the heading angle with a bin range;
assigning one or more points to a respective bin based on a match between a heading angle and the respective bin; and
selecting one of the bins as indicating the heading angle for the selected relative heading when the number of points assigned to the bin exceeds a points threshold.

3. The UAV as recited in claim 2, the operations further comprising increasing an amount of points or a weighting of points assigned to the respective bin based on a magnitude of a corresponding first acceleration or second acceleration for a respective heading angle.

4. The UAV as recited in claim 1, wherein the threshold amount is a first threshold amount, the operations further comprising:
determining a confidence value for the selected relative heading based at least on a number of matches within a second threshold amount of the largest subset of the relative headings matching each other within the first threshold amount; and
selecting the selected relative heading based in part on the confidence value being above a threshold confidence value.

5. The UAV as recited in claim 1, the operations further comprising:
receiving the first accelerations and the second accelerations prior to takeoff of the UAV based on motion induced on the UAV prior to takeoff.

6. The UAV as recited in claim 1, the operations further comprising:
receiving the first accelerations and the second accelerations during takeoff of the UAV by causing the UAV to takeoff using a known acceleration profile.

7. A method comprising:
inducing motion on an unmanned aerial vehicle (UAV) prior to takeoff;
determining, by one or more processors, first accelerations of the UAV based on information from an accelerometer onboard the UAV;
determining second accelerations of the UAV based on location information received via a global navigation satellite system (GNSS) receiver;
determining a plurality of relative headings of the UAV respectively based on the first accelerations and the second accelerations;
selecting one of the plurality of relative headings based on a largest subset of the plurality of relative headings matching each other within a threshold amount; and
performing navigation of the UAV at least one of during or after takeoff of the UAV based on the selected relative heading.

8. The method as recited in claim 7, further comprising inducing the motion on the UAV by moving the UAV in a back-and-forth motion prior to takeoff.

9. The method as recited in claim 7, determining the first accelerations in a navigation frame of reference based on an output from an inertial measurement unit (IMU) that is associated with the accelerometer.

10. The method as recited in claim 7, further comprising determining the second accelerations in a world frame of reference based on the location information received via the GNSS receiver by determining finite differences in velocity signals determined based on the received location information.

11. The method as recited in claim 7, further comprising:
establishing a plurality of bins, each bin corresponding to a range of heading angles;
matching individual relative headings to individual ones of the bins based on matching the heading angle with a bin range;
assigning one or more points to a respective bin based on a match between a heading angle and the respective bin; and
selecting one of the bins as indicating the heading angle for the selected relative heading when the number of points assigned to the bin exceeds a points threshold.

12. The method as recited in claim 7, wherein the threshold amount is a first threshold amount, the method further comprising:
determining a confidence value for the selected relative heading based at least on a number of matches within a second threshold amount of the largest subset of the relative headings matching each other within a first threshold amount; and
selecting the relative heading based in part on the confidence value being above a threshold confidence value.

13. A method comprising:
configuring an unmanned aerial vehicle (UAV) to takeoff at a specified trajectory using a specified acceleration profile;
determining, by one or more processors of the UAV, first accelerations of the UAV based on information from an accelerometer onboard the UAV during takeoff;
determining second accelerations of the UAV based on location information received via a global navigation satellite system (GNSS) receiver during the takeoff;
determining a plurality of relative headings of the UAV respectively based on the first accelerations and the second accelerations;
selecting one of the plurality of relative headings based on a largest subset of the plurality of relative headings matching each other within a threshold amount; and
performing navigation of the UAV after takeoff of the UAV based on the selected relative heading.

14. The method as recited in claim 13, wherein the specified trajectory is diagonal to a ground plane.

15. The method as recited in claim 13, determining the first accelerations in a navigation frame of reference based on output from an inertial measurement unit (IMU) that is associated with the accelerometer.

16. The method as recited in claim 13, further comprising determining the second accelerations in a world frame of reference based on the location information received via the GNSS receiver by determining finite differences in velocity signals determined based on the received location information.

17. The method as recited in claim 13, further comprising:
establishing a plurality of bins, each bin corresponding to a range of heading angles;
matching individual relative headings to individual ones of the bins based on matching the heading angle with a bin range;
assigning one or more points to a respective bin based on a match between a heading angle and the respective bin; and
selecting one of the bins as indicating the heading angle for the selected relative heading when the number of points assigned to the bin exceeds a points threshold.

* * * * *